United States Patent
Parral et al.

(10) Patent No.: US 10,603,622 B2
(45) Date of Patent: *Mar. 31, 2020

(54) ADSORPTION AIR SEPARATOR WITH DRY AIR TAP

(71) Applicant: Pacific Consolidated Industries, LLC, Riverside, CA (US)

(72) Inventors: Mark Parral, Apple Valley, CA (US); Jason Burns, Irvine, CA (US); Sören Schmitz, Oakton, VA (US); Tarik Naheiri, Dana Point, CA (US)

(73) Assignee: Pacific Consolidated Industries, LLC, Riverside, CA (US)

( * ) Notice: Subject to any disclaimer, the term of this patent is extended or adjusted under 35 U.S.C. 154(b) by 83 days.

This patent is subject to a terminal disclaimer.

(21) Appl. No.: 15/811,326

(22) Filed: Nov. 13, 2017

(65) Prior Publication Data
US 2018/0065076 A1 Mar. 8, 2018

Related U.S. Application Data

(63) Continuation of application No. 14/974,129, filed on Dec. 18, 2015, now Pat. No. 9,821,264.
(Continued)

(51) Int. Cl.
*B01D 53/04* (2006.01)
*B01D 53/00* (2006.01)
(Continued)

(52) U.S. Cl.
CPC ........... *B01D 53/002* (2013.01); *B01D 53/02* (2013.01); *B01D 53/0476* (2013.01);
(Continued)

(58) Field of Classification Search
CPC .......... B01D 2257/102; B01D 2257/11; B01D 2257/40; B01D 2257/80;
(Continued)

(56) References Cited

U.S. PATENT DOCUMENTS 3,436,839 A * 4/1969 Ellington ........... B01D 53/0438
34/80
4,233,038 A * 11/1980 Tao ........................ B01D 53/04
95/104
(Continued)

*Primary Examiner* — Frank M Lawrence, Jr.
(74) *Attorney, Agent, or Firm* — Heisler & Associates

(57) ABSTRACT

The adsorption based air separation unit includes an adsorber vessel containing media which selectively adsorbs water vapor and nitrogen preferentially over oxygen. The vessel includes an air entry spaced from an oxygen discharge. At least one dry air tap from the adsorber vessel is located between the entry and the discharge. When the adsorption media is fresh, air entering the adsorber vessel passes through enough of the adsorber vessel to have much of its water vapor removed and only some of its nitrogen removed. The vessel can include multiple taps sequentially further from the entry which can be selectively opened as the adsorption media becomes saturated with water vapor and nitrogen, so that dry air with much of its nitrogen still present can be further tapped from the adsorber vessel. The adsorber vessel thus facilitates production of both oxygen and dry air, such as for use as medical grade air.

10 Claims, 6 Drawing Sheets

Related U.S. Application Data

(60) Provisional application No. 62/098,052, filed on Dec. 30, 2014.

(51) Int. Cl.
| | | |
|---|---|---|
| *B01D 53/047* | (2006.01) | |
| *B01D 53/02* | (2006.01) | |
| *B01D 53/22* | (2006.01) | |
| *B01D 63/02* | (2006.01) | |
| *B01D 53/053* | (2006.01) | |

(52) U.S. Cl.
CPC ............ *B01D 53/22* (2013.01); *B01D 53/229* (2013.01); *B01D 63/02* (2013.01); *B01D 53/053* (2013.01); *B01D 2256/12* (2013.01); *B01D 2257/102* (2013.01); *B01D 2257/11* (2013.01); *B01D 2257/40* (2013.01); *B01D 2257/80* (2013.01); *B01D 2259/401* (2013.01); *B01D 2259/402* (2013.01); *B01D 2259/40007* (2013.01); *B01D 2259/40009* (2013.01)

(58) Field of Classification Search
CPC ........... B01D 2259/40007; B01D 2259/40009; B01D 2259/401; B01D 2259/402; B01D 53/002; B01D 53/02; B01D 53/04; B01D 53/0476; B01D 53/053; B01D 53/22; B01D 53/229; B01D 2256/12; B01D 63/02

USPC ................ 95/95–102, 117, 130; 96/108, 147
See application file for complete search history.

(56) References Cited

U.S. PATENT DOCUMENTS

| | | | | |
|---|---|---|---|---|
| 4,253,855 | A * | 3/1981 | Jackson | B01D 46/26 55/290 |
| 4,326,858 | A * | 4/1982 | Benkmann | B01D 53/0476 95/98 |
| 4,640,694 | A * | 2/1987 | Leitgeb | B01D 53/047 95/100 |
| 5,344,474 | A * | 9/1994 | Null | B01D 53/047 55/344 |
| 5,620,504 | A * | 4/1997 | Coates | B01D 53/053 96/114 |
| 5,882,380 | A * | 3/1999 | Sircar | B01D 53/053 95/98 |
| 8,404,024 | B2 * | 3/2013 | Henderson | B01D 53/0462 95/104 |
| 8,496,738 | B1 * | 7/2013 | Naheiri | B01D 53/0476 137/511 |
| 9,821,264 | B2 * | 11/2017 | Parral | B01D 53/0476 |
| 2004/0028576 | A1 * | 2/2004 | Jain | C01B 13/0229 422/186.07 |
| 2010/0095841 | A1 * | 4/2010 | Naheiri | B01D 53/0476 95/26 |
| 2012/0292178 | A1 * | 11/2012 | Duerksen | C01B 13/0259 204/158.2 |

* cited by examiner

ADSORPTION AIR SEPARATOR WITH DRY AIR TAP

CROSS-REFERENCE TO RELATED APPLICATIONS

This application is a continuation of U.S. patent application Ser. No. 14/974,129 filed on Dec. 18, 2015, which claims benefit under Title 35, United States Code § 119(e) of U.S. Provisional Application No. 62/098,052 filed on Dec. 30, 2014.

FIELD OF THE INVENTION

The following invention relates to adsorption based air separation units which produce oxygen by selective adsorption of nitrogen therefrom. More particularly, this invention relates to air separation units which produce both oxygen and also dry air by utilizing properties of adsorption media which adsorb water vapor and nitrogen preferably over oxygen.

BACKGROUND OF THE INVENTION

Air separation for production of oxygen or other gases is known using a variety of technologies. For instance, such technologies include liquefaction, pressure swing adsorption and vacuum swing adsorption.

The production of oxygen using vacuum swing adsorption (VSA) is well-known to air separation technologists. VSA offers a simple non-cryogenic method to produce gaseous oxygen at purities of 80% to 95%. In the last 20 years oxygen VSA plants have become widespread and are offered in various bed configurations. The multi-bed VSA is typically used in the size rage of 60 tons per day (TPD) and higher. The single bed process was adopted as a lower capital, simpler process for lower production ranges, typically 1 TPD up to 40 TPD. Typical single bed systems usually consist of a single blower train that is used for both the feed air provider as well as the regeneration vacuum system. The process usually incorporates automatic valves to direct the air and vacuum flows during the cycle. A newer embodiment of the single bed process uses a reversing blower to generate the feed stream and apply vacuum for the regeneration step. This latest embodiment is well suited for small to medium sized oxygen VSA production plants (1 to 10 TPD). One example of a single bed reversing blower (SBRB) VSA process of this type is described in U.S. Pat. No. 8,496,738.

Although the single bed reversing blower (SBRB) VSA process is simple in practice, its simplicity comes with performance trade-offs when compared to multi-bed systems. Firstly, the lack of additional adsorber beds does not allow for a crucial bed to bed equalization. The pressure equalization step is key to lowering power consumption and increasing product oxygen recovery. Technologists in the art have overcome this deficiency by adding an equalization tank to the SBRB system (such as equalization tanks in SBRB systems provided by Air Liquide of Houston, Tex.).

A need exists in some environments for both oxygen and dry air. For instance, in a hospital environment it is desirable to have medical grade oxygen as well as medical grade air. Medical grade air is substantially dry air which can most effectively be utilized in hospital machinery that requires a dry air supply. This might be drive gas for medical equipment or other medical equipment which requires medical grade air.

SUMMARY OF THE INVENTION

With this invention a single bed reversing blower VSA system (or other VSA system or other adsorption based air separator) is provided to supply the medical grade oxygen (or oxygen for other uses). The reversing blower VSA system (or other air separator) is modified to also provide medical grade air (or dry air for other uses). In particular, the adsorber bed is configured with a tap off outlet a short distance from the inlet end of the adsorber bed. For instance, two to twelve inches from the inlet a tap is provided out of the adsorption bed. This tap is for medical grade air. A check valve or other valve (e.g. a control valve) would be provided on this tap to prevent medical grade air from being pulled back into the adsorber bed when the blower reverses.

Molecular sieve material utilized for producing oxygen selectively adsorbs nitrogen in air more than oxygen. Such material also typically selectively adsorbs water vapor and carbon dioxide. Most typically, the molecular sieve material preferentially adsorbs water vapor even more than nitrogen. Thus, when the material within the adsorption bed is saturated with nitrogen and the system requires that the reversing blower reverse for recharging of the adsorption bed, the molecular sieve material is still able to adsorb more water vapor. Thus, medical grade air can be provided from the tap throughout the VSA process.

Initially, the tap is pulling mostly air, with perhaps some increased percentage of oxygen, because the air is giving up water vapor more than nitrogen in the first two to twelve inches of the adsorption bed. If the tap were located further along the flow pathway within the adsorption bed, the tap would be pulling higher and higher concentrations of oxygen in the medical grade air.

As one alternative, multiple taps can be provided into the adsorption bed. A tap closest to the inlet would first be utilized when the blower is providing its initial primary flow through the adsorption bed. As the bed is becoming saturated, a tap further downstream within the adsorption bed would be opened and the first tap would typically be closed. This sequence could be further repeated with a third tap and other downstream taps. These taps could all be joined together so that only one medical grade air outlet from the bed is fed by each of the tap inlets. A check valve on this medical grade air line can be provided to close when the reversing blower reverses, so that purge oxygen from a purge tank downstream of the adsorber bed is not pulled into the medical grade air system, and so that the vacuum created within the adsorber bed before final purge does not pull medical grade air back into the adsorber bed and frustrate the system's attempts to reduce pressure within the adsorber bed.

OBJECTS OF THE INVENTION

Accordingly, a primary object of the present invention is to provide an air separation system which both produces oxygen and dry air, such as for supply of medical grade oxygen and medical grade air, in a single system.

Another object of the present invention is to provide a method for separating both dry air and oxygen from ambient air in an adsorption based air separation unit.

Another object of the present invention is to provide an apparatus which produces both medical grade air and oxygen, such as medical grade oxygen, from a single air separation unit.

Another object of the present invention is to provide an adsorber vessel which includes an air inlet for ambient air and a discharge for oxygen and a tap for collection of dry air therefrom, so that a single adsorber vessel can be utilized for production of multiple different valuable constituents.

Other further objects of the present invention will become apparent from a careful reading of the included drawing figures, the claims and detailed description of the invention.

DESCRIPTION OF THE PREFERRED EMBODIMENT

Figure 1:
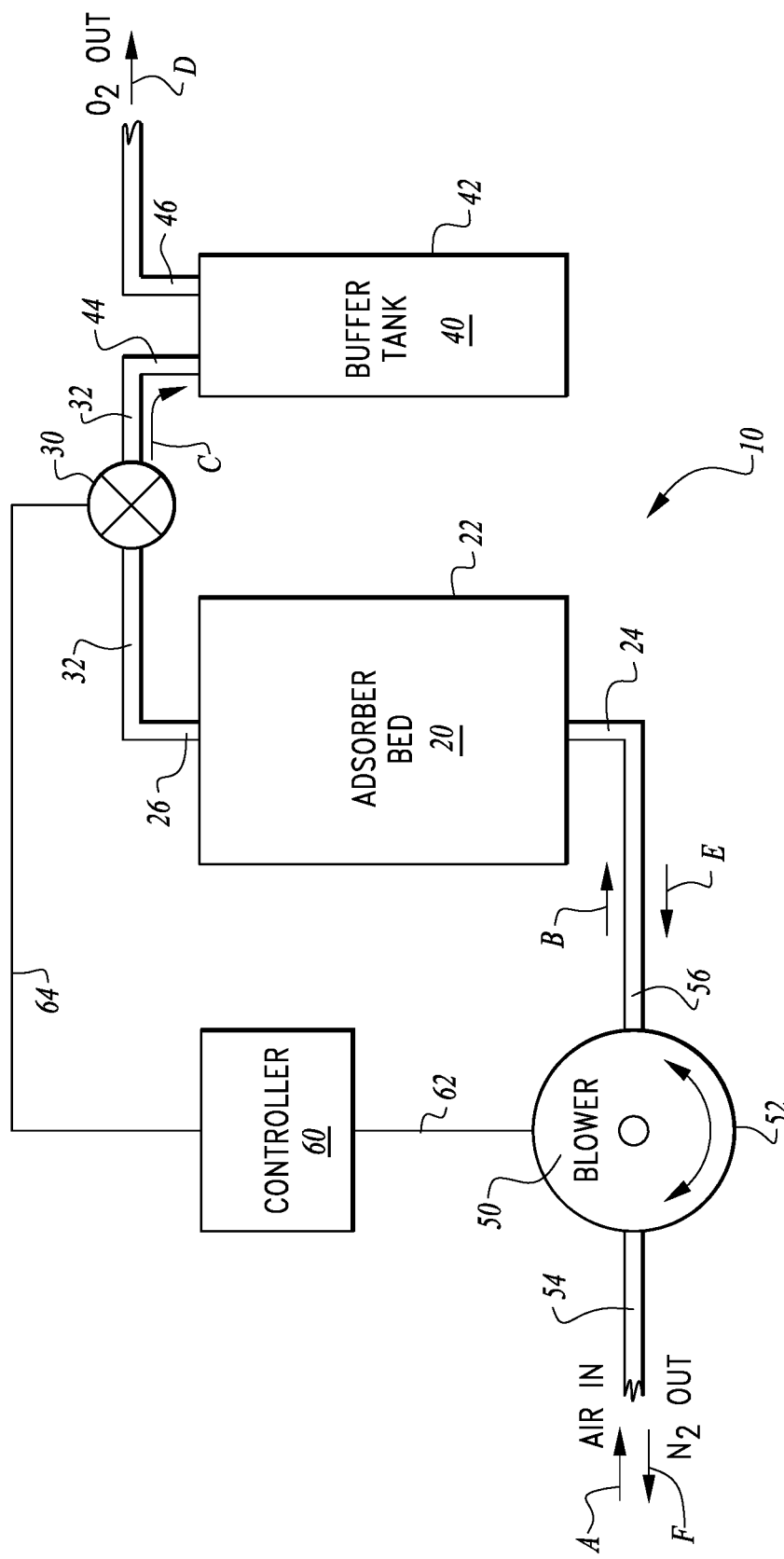
FIG. 1 is a schematic of a prior art single bed reversing blower vacuum swing adsorption air separation unit to which the technology of this invention is addressed.

Referring to the drawings, wherein like reference numerals represent like parts throughout the various drawing figures, reference numeral 10 (FIG. 1) is directed to a prior art oxygen separator configured to separate/concentrate oxygen from air. This separator is modified by the air separation unit 110 of this invention (FIGS. 2-5) and the blower driving system 210 of this invention (FIG. 4), as explained in detail below.

In essence, and with particular reference to FIG. 1, basic details of the oxygen separator 10 modified by the air separation unit 110 and blower driving system 210 of this invention are disclosed. The oxygen separator 10 includes an adsorber bed 20 including an adsorber material therein which preferentially adsorbs nitrogen, $CO_2$ and water over oxygen. A valve 30 is located downstream of the adsorber bed 20. A buffer tank 40 is provided downstream of the valve 30. A blower 50 defines a preferred form of pump located upstream of the adsorber bed 20. A controller 60 is coupled to the valve 30 and the blower 50 (or other pump) to control opening and closing of the valve 30 and to control a direction in which the blower 50 (or other pump) is operating, to either provide air into the adsorber bed 20 or pull a vacuum to desorb and remove nitrogen out of the adsorber bed 20. Normally, a heat exchanger is required between the blower and the adsorber bed to remove the heat generated when the air is compressed. The heat exchanger may be bypassed during the vacuum phase of the cycle.

With continuing reference to FIG. 1, details of the adsorber bed 20 are described. The adsorber bed 20 includes an enclosure 22 for containing the adsorber material. This enclosure 22 includes an inlet 24 spaced from an outlet 26. The inlet 24 and outlet 26 define preferred forms of first and second ports for access into the enclosure 22. The inlet 24 and outlet 26 normally are incorporated in closures or "end plates" which can be removed to allow access to the adsorption components in the enclosure 22. Otherwise, the enclosure 22 is preferably sealed to prevent leakage of gases into or out of the enclosure 22.

The adsorber material within the adsorber bed 20 could be any form of material which preferentially adsorbs nitrogen over oxygen. One such material is molecular sieve such as nitroxy siliporite. This material is preferably supplied in the form of beads which are either generally spherical in form or can be of irregular shape. Since the beads are composed of molecular sieve material within the enclosure 22, gaseous pathways extend through, between and around the adsorbent material.

Most preferably, a plenum is configured at the inlet and the outlet end of the adsorber bed to provide even gas flow across the cross section of the bed. In a preferred configuration, the inlet 24 is located below the outlet 26, and with the inlet 24 at a lowermost portion of the enclosure 22 and the outlet 26 on an uppermost portion of the enclosure 22. The enclosure 22 could have a variety of different shapes. In one embodiment, the enclosure 22 could be generally rectangularly shaped. The enclosure could be shaped like a pressure vessel to maximize an amount of vacuum to be drawn on the enclosure 22 while minimizing an amount of material strength (i.e. wall thickness or material choice) that must be designed into the enclosure 22. If the size of the adsorber material is sufficiently small to potentially pass through the inlet 24 or outlet 26, filters are provided at the inlet 24 and outlet 26 to keep the adsorbent material within the enclosure 22.

With continuing reference to FIG. 1, details of the valve 30 are described. The valve 30 is interposed on a line 32 extending from the outlet 26 of the adsorber bed 20 and extending to the buffer tank 40. This line 32 is preferably substantially rigid, especially between the valve 30 and adsorber bed 20, so that when a vacuum is drawn on the adsorber bed 20, the line 32 does not collapse. The valve 30 is preferably sealed to prevent leakage in any manner when in a closed position and to only allow passage of gas along the line 32 when in an open position.

The valve 30 is preferably coupled to a controller 60 which controls the opening and closing of the valve 30. Optionally, the valve 30 could have a controller built into the valve 30 that could be set a single time and then operate in accordance with its settings.

While the valve 30 would typically be programmed once and then operate in accordance with such settings, the valve 30 could optionally be controlled at least partially through a control system including sensors and feedback to the valve 30. For instance, an oxygen sensor could be provided adjacent the valve 30 or along the line 32 between the valve 30 and the adsorber bed 20 to detect oxygen concentration levels approaching the valve 30. Nitrogen adjacent the valve 30 would be indicative that the adsorbent material within the adsorber bed 30 is saturated with nitrogen and that the oxygen separator 10 needs to change operating modes, to have the blower 50 (or other pump) reverse to pull a vacuum and desorb nitrogen from the adsorber material and pull the nitrogen out of the adsorber bed 20 to recharge the system.

Normally control of the cycle is achieved with the use of pressure transducers which reverse the blower at appropriate times. Usually the purge cycle is initiated when the vacuum reaches a certain predetermined level. The valve 30 is then opened for a predetermined amount of time so that a purge layer of oxygen is allowed to purge the remaining nitrogen from the bed. So the pressure and vacuum cycle are determined by pressure and the purge portion of the cycle is timed.

Other sensors could also potentially be utilized to allow the oxygen separator 10 to operate most effectively. The valve 30 is preferably of a type which operates with a minimum of lubricant or which can operate with a lubricant which is compatible with the handling of oxygen. The valve 30 and other portions of the oxygen separator 10 are also preferably formed of materials which are compatible with the handling of oxygen. For instance, brass is often effective in handling of oxygen and so brass is one material from which the valve 30 could be suitably manufactured when the system 10 is used for oxygen separation.

With continuing reference to FIG. 1, details of the buffer tank 40 are described. The buffer tank 40 is not strictly required for operation of the system, but allows for the system in the form of the oxygen separator 10 to deliver oxygen substantially continuously, and to moderate pressure spikes in the system. The buffer tank 40 includes an enclosure 42 with an input 44 and an output 46 in FIG. 1. However, normally the buffer tank does not have a separate inlet and outlet. Since its purpose is simply to be an accumulator and minimize the pressure fluctuations inherent in the pressure swing adsorption process. The input 44 is coupled to the line 32 on a side of the valve 30 downstream from the adsorber bed 20.

The buffer tank 40 would typically have some form of regulator valve on the output 46 which would deliver oxygen out of the buffer tank 40 when oxygen is required by oxygen utilizing systems downstream of the buffer tank 40. The input 44 of the buffer tank 40 can remain in fluid communication with the valve 30. The buffer tank 40 can contain oxygen at above atmospheric pressure and at a pressure matching or slightly below an operating pressure of the adsorber bed 20 when the adsorber bed 20 is actively adsorbing nitrogen and oxygen flows into the buffer tank 40.

A sensor can be associated with the buffer tank 40 which cooperates with the controller 60 to shut off the oxygen separator 10 when the buffer tank 40 nears a full condition. In many applications a compressor is located downstream from the buffer tank 40 to fill oxygen vessels. When the vessels are full the system would be shut off. If required, a pressure regulator can also be provided on the output 46 of the buffer tank 40 so that pressure of oxygen supplied out of the buffer tank 40 remains substantially constant. Similarly, an oxygen pump could be provided downstream of the buffer tank 40 if the oxygen were required to be supplied at an elevated pressure above pressure within the buffer tank 40.

Most preferably, the buffer tank 40 is not a particularly high pressure tank so that the oxygen separator 10 including the blower 50 (or other pump) and adsorber bed 20 do not need to operate at a particularly high pressure when delivering oxygen to the buffer tank 40. By minimizing the pressure of the buffer tank 40, the weight of the buffer tank 40 (and other components of the system 10) can be significantly reduced. Furthermore, the power consumed by the blower is reduced as the pressure drop across the blower is reduced.

With continuing reference to FIG. 1, details of the blower 50 (or other pump) are described. This blower 50 generally includes a housing 52 with some form of prime mover therein coupled to a driver, such as an electric motor. The housing 52 of the blower 50 includes an entry 54 in direct access with a surrounding environment in a preferred embodiment. A discharge 56 is also provided on the housing 52 which is located on a side of the blower 50 closest to the adsorber bed 20.

The blower 50 is preferably in the form of a two or three lobed rotary blower coupled in direct drive fashion to an electric motor. In one embodiment the electric motor is a five horsepower three phase motor and the rotary blower is a two or three lobed blower and can deliver approximately one hundred cubic feet per minute when operating at atmospheric pressure. This rotary blower is also preferably configured to have acceptable performance when drawing a vacuum on the adsorber bed 20.

The lobes of the rotary blower are preferably configured so that they are of approximately similar efficiency in moving gases through the blower 50 between the entry 54 and the discharge 56 in either direction. In one form, the lobes are thus symmetrical in form so that they act on the air similarly in both directions of rotation for the blower 50.

The blower 50 is preferably substantially of a positive displacement type so that it maintains an adequate performance when drawing a vacuum on the adsorber bed 20 so that nitrogen can be effectively desorbed from the adsorber material in the adsorber bed 20 when the blower 50 is operating in a reverse direction to pull nitrogen out of the adsorber bed 20 and deliver the nitrogen out of the entry 54.

Most preferably, the blower 50 is coupled in direct drive fashion to the electric motor (or though a gear box). Most preferably, the electric motor is a three phase alternating current motor which can easily be reversed by reversing two of the phases. In this way, the controller 60 need merely reverse two poles of the three phase motor. In an other embodiment a direct current, permanent magnet may be used wherein the direction of the rotation can be reversed by reversing the polarity which in turn will reverse the rotation of the blower. Almost all three phase electric motors are capable of being reversed as above. Direct current motors are also readily available from many manufacturers which reverse their rotation direction by changing polarity.

Other types of pumps could alternatively be utilized for drawing air into the adsorber bed 20 and pulling nitrogen out of the adsorber bed 20 for the oxygen separator 10. For instance, such a pump could be a positive displacement pump, such as a piston pump or a peristaltic pump. Other forms of positive displacement pumps could also be utilized including gerotor pumps, gear pumps, etc. Other forms of pumps rather than strictly positive displacement pumps could also be selected, such as centrifugal pumps or axial flow pumps. The most efficient scheme for pumping the air into the system and exhausting the bed depends on the requirements of the final user.

With continuing reference to FIG. 1, details of the controller 60 are described according to a preferred embodiment. The controller 60 is shown as a separate unit coupled to the blower 50 (or other pump) through a blower signal line 62 and coupled to the valve 30 through a valve signal line 64. The controller 60 could in fact be integrated into the valve 30 or integrated into the blower 50 (or other pump) or be provided as a standalone unit such as depicted in FIG. 1. It is also understood that the controller 60 could be split into two (or more) separate devices, either separate from the blower 50 and valve 30 or integrated into both the blower 50 and valve 30.

The controller 60 provides the basic function of controlling a direction in which the blower 50 is operating and whether the valve 30 is open or closed. Control systems have been used which simply time the cycle. More often, the controller is configured to react to pressure or some other input.

A preferred sequence for directional control of the blower 50 and opening and closing of the valve 30 are described in detail below. The controller 60 could be in the form of a programmable logic device or could be in the form of an application specific integrated circuit, or could be in the form of a CPU of a special purpose computer or a general purpose personal computer or other computing device. The controller 60 could be configured to have operating parameters set at a central controlled location, such as during manufacture, or could be configured to allow for programming in the field before and/or during operation.

In use and operation, and with particular reference to FIG. 1, details of the operation of the oxygen separator 10 of the prior art are described. It will be understood that the separator 10 would operate similarly when separating other gases than when separating oxygen from air, and the operation as an oxygen separator 10 is provided merely as one example.

Initially, the system 10 is configured with the valve 30 closed and the blower 50 (or other pump) is caused to rotate in a direction driving gases out of the adsorber bed 20 (along arrow E). This is the vacuum cycle used to desorb nitrogen out of the beads in the bed 20. In particular, the blower 50 rotates to cause gases to be pulled into the entry 54 (along arrow E). This gas is removed from the bed 20 by the blower 50 and caused to pass through the discharge 54 away from the adsorber bed 20 along arrow F and to the surrounding atmosphere.

Nitrogen (or other undesirable gas) is adsorbed by the adsorber material within the adsorber bed 20. Most typically, the adsorber material also adsorbs water vapor and carbon dioxide, as well as potentially trace amounts of other gases, including pollutants.

During the last portion of the vacuum cycle valve 30 is opened to allow a small amount of the contents of the buffer tank to be introduced into the adsorber bed. This step is called the "purge phase." The purge phase is used to purge nitrogen (as well as some carbon dioxide and water out of plumbing lines and free space between the valve 30 and the blower 50, but not appreciably out into the surrounding atmosphere. This short purge phase is typically timed to match an amount calculated or determined by experiment, but could also be ended based on sensor readings. This purge phase ends the vacuum cycle and precedes the adsorption cycle to follow.

The blower is then reversed to commence the adsorption cycle. Air is drawn into the blower at the inlet 54 port of the blower 50 (in the direction shown by arrow A). The air flows (along arrow B) into the adsorber bed 20 where nitrogen, carbon dioxide, and water are preferentially adsorbed. The gas not adsorbed in the adsorber bed (normally a mixture of oxygen and argon) is passed through valve 30 into the buffer tank 40.

The adsorber bed 20 might also adsorb oxygen to some extent. However, the adsorber material is selected so that it preferentially adsorbs nitrogen more than oxygen. Due to the presence of the adsorber material within the adsorber bed 20, substantially only oxygen (or other desirable gas) can leave the adsorber bed 20 through the outlet 26. Typically, argon also remains with the oxygen. Because air is approximately 1% argon and approximately 20% oxygen, this twenty to one ratio typically causes the gases being discharged from the adsorber bed 20 at the outlet 26 to be approximately 95% oxygen and 5% argon.

Because the valve 30 is opened, this oxygen can flow (along arrow C) through the valve 30 and into the buffer tank 40. The buffer tank 40 is thus charged with oxygen. If oxygen is desired, it can be discharged from the buffer tank 40 output 46 (along arrow D). The adsorber material within the adsorber bed 20 eventually becomes saturated with nitrogen and other compounds, such as water vapor and carbon dioxide. The point of such saturation can be calculated in advance and calibrated into the separator 10. Alternatively, a sensor can be provided, such as along the line 32 adjacent the valve 30, to sense for nitrogen or other contaminants within what should be substantially only oxygen and argon. Such a sensor can cause the system to detect such saturation of the adsorbent material within the adsorber bed 20 and thus change the mode of operation of the oxygen separator 10 from the adsorption cycle to the vacuum cycle. Other sensors to trigger the change could be pressure sensors or volumetric flow rater sensors either alone or in combination with a clock or a calibration table. The goal is to prevent nitrogen or other contaminates from passing the valve 30 after adsorption bed 20 saturation.

When such saturation has either been sensed as occurring or predicted to occur, the separator 10 changes operation modes by closing the valve 30. Then the blower 50 (or other pump) reverses its direction of operation. For instance, the controller 60 can reverse two of the three phases of a three phase electric motor coupled to the blower. The blower 50 is then caused to turn in an opposite direction and begins pulling gas (along arrow E) out of the adsorber bed 20 and into the blower 50 from the discharge 56 and out of the blower 50 through the entry 54 and out into a surrounding environment, as a repeat of the vacuum cycle described above.

The controller 60 can be programmed with a typical amount of time required to effectively desorb the nitrogen from the adsorbent material within the adsorber bed 20. Normally, the controller 60 senses a threshold low pressure in the adsorber bed 20. The system operation then continues as described above with a short purge phase followed by return to the desorption cycle.

This operating sequence for the oxygen separator 10 can repeat itself potentially indefinitely. When the buffer tank 40 becomes full (or vessels being filled from the buffer tank 40 are full), an appropriate sensor associated with the buffer tank 40 can indicate that it is full and shut off the oxygen separator 10. As further amounts of oxygen are sensed as being needed, such as by a drop in pressure in the buffer tank 40, a signal can be sent to the controller 60 to again cause the system to commence operation.

With this invention a modified air separation unit 110 implements a modification of the prior art single bed reversing blower (SBRB) vacuum swing adsorption (VSA) oxygen separator 10 through the air separation unit 110 of this invention and the driving system 210 described in more detail below. The SBRB VSA air separation unit (ASU) 110 is modified in this exemplary ASU 110 to include a purge recovery tank 160. Many other portions of the ASU 110 have analogs in the prior art SBRB VSA technology such as that shown in FIG. 1.

Figure 2:
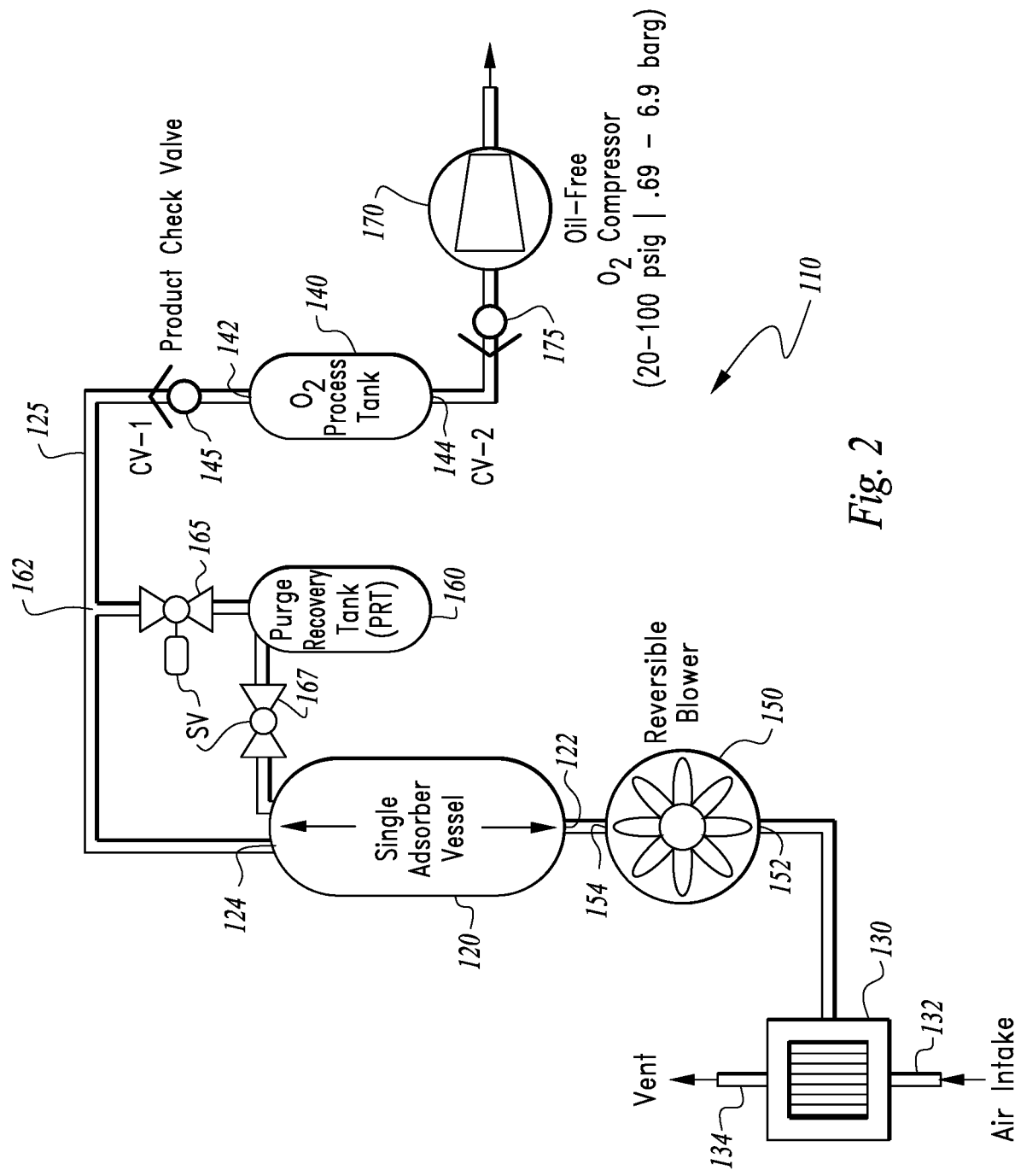
FIG. 2 is a schematic of a single bed reversing blower vacuum swing adsorption air separation unit incorporating a purge recovery tank therein to enhance performance of the air separation unit and defining a modified vacuum swing adsorption air separation process according to this invention.

In essence, and with particular reference to FIG. 2, basic details of the ASU 110 are described, according to a preferred embodiment with the ASU 110 also typically including many of the details of the oxygen separator 10 as described above. A single adsorber vessel 120 is fed by an intake 130 which supplies air to the vessel 120. Downstream of the vessel 120, an $O_2$ supply line 125 leads to an $O_2$ process tank 140 which is optionally provided to contain excess $O_2$ before it is utilized by equipment and/or for processes downstream of the $O_2$ process tank 140. A reversible blower 150 is interposed between the adsorber vessel 120 and the intake 130. A purge recovery tank 160 is coupled to the $O_2$ supply line 125 downstream of the vessel 120, preferably through a control valve 165 to control whether the purge recovery tank 160 is open or closed. A compressor 170 is preferably provided downstream of the $O_2$ process tank which can control pressure of $O_2$ supplied from the ASU 110.

More specifically, and with continuing reference to FIG. 2, specific details of the ASU 110 are described. The single adsorber vessel 120 extends between an inlet 122 and an outlet 124, with the inlet 122 defining a side of the vessel 120 closest to the intake 130 and the outlet 124 on a side of the vessel 120 opposite the inlet 122. This vessel 120 can have any of a variety of configurations. While this vessel 120 is described as a single adsorber vessel 120, it is conceivable that a manifold upstream and downstream of the single adsorber vessel 120 could be provided so that multiple vessels 120 could be provided in parallel, but operating in unison so that the ASU 110 is still functioning as a single bed reversing blower (SBRB) system but with optionally additional vessels 120 merely to adjust size of the vessel 120.

The vessel 120 contains an adsorption material which preferentially adsorbs $N_2$ over $O_2$. This material is typically provided in the form of beads or other solid media which allow for gas to flow about the solid media as the gas extends from the inlet 122 to the outlet 124, and past surfaces of the adsorption material. Surfaces of the adsorption material adsorb nitrogen thereon, allowing $O_2$ to pass through the vessel 120. Typically, the material within the vessel 120 also adsorbs water vapor and various other gases, while typically argon within the air is not adsorbed but passes out of the vessel 120 along with the oxygen. The vessel 120 includes a container wall which is sufficiently strong so that it can maintain its volume when experiencing pressures ranging from near vacuum at a low end to approximately atmospheric (but potentially slightly higher than atmospheric pressure) at a high end.

The intake 130 in a simplest form merely includes an opening which is open to a surrounding atmosphere for intake of air into the ASU 110. In the embodiment depicted, the intake 130 can include some form of filter element, such as a particulate filter and includes an air port 132 spaced from a purge port 134. A valve within the intake 130 causes air to be drawn in through the air port 132 when the blower 150 is drawing air into the vessel 120, and the purge port 134 discharges gas (including mostly $N_2$) when the blower 150 has reversed and is pulling gas out of the vessel 120. The purge port 134 is preferably spaced from the air port 132 to minimize the potential for nitrogen exhaust to find its way back into the air port 132. If desired, the purge port 134 can lead to other equipment such as nitrogen recovery equipment.

Figure 4:
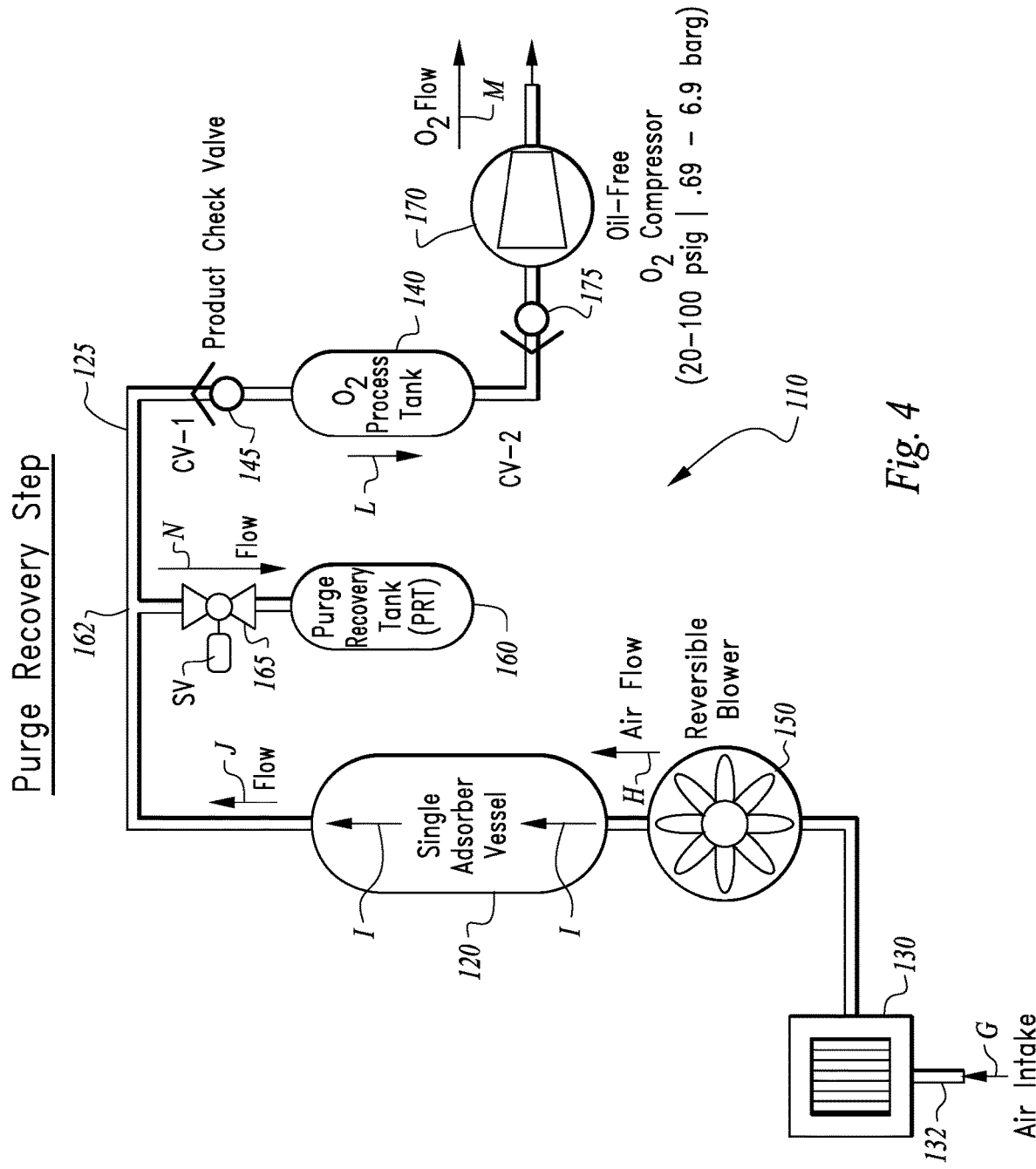

Regions downstream of the vessel 120 are together generally referred to collectively as the $O_2$ output in that gas of mostly $O_2$ remains in these portions of the ASU 110. The $O_2$ process tank 140 could be avoided in systems where oxygen is used as it is produced or where discharge of excess $O_2$ beyond that utilized by the equipment downstream of the ASU 110 can merely be discharged to atmosphere, or can be avoided in systems where downstream equipment from the ASU 110 itself includes appropriate volume, such as in the form of tanks or other equipment so that the $O_2$ process tank 140 is not needed. However, typically an $O_2$ process tank 140 is provided to hold excess $O_2$ produced when the reversible blower 150 is driving air into the vessel 120 and the ASU 110 is producing $O_2$, so that when the blower 150 reverses and the vessel 120 is in recovery mode and discharging nitrogen therefrom, $O_2$ can continue to be supplied from the $O_2$ process tank 140 to supply downstream oxygen utilizing equipment (FIG. 4).

Most preferably, a product check valve 145 is provided upstream of the $O_2$ process tank 140. This check valve 145 acts to keep pressurized oxygen within the $O_2$ process tank 140 and preventing back flow of oxygen back toward the vessel 120. This product check valve 145 also provides one form of valve within the $O_2$ supply line 125 which the reversible blower 150 works against so that an at least partial vacuum can be drawn on the vessel 120, without significant leakage of any gases into the vessel 120 from the $O_2$ supply line 125. Such a vacuum is needed to allow for recovery of the material within the vessel 120 by causing the material to give up the $N_2$ and return to a state where it is ready to again preferentially adsorb $N_2$ and supply $O_2$ to the $O_2$ process tank 140. The $O_2$ process tank 140 includes an inlet 142 opposite an outlet 144 with the inlet 142 adjacent to the product check valve 145 and the outlet 144 leading further into equipment downstream of the ASU 110 which utilize oxygen.

The reversible blower 150 includes an inlet 152 on a side of the reversible blower 150 closest to the intake 130 and an outlet 154 on a side of the reversible blower 150 opposite the inlet 152. This reversible blower 150 is preferably a positive displacement pump, most typically of a rotary lobe variety which can both efficiently blow air through the vessel 120 to produce oxygen, but also effectively draw a vacuum on the vessel 120 when reversed. The motor coupled to the rotary lobe prime mover of the reversible blower 150 is most preferably a type of electric motor which can readily be reversed in direction, such as by reversing a polarity of an electric field associated with the electric motor, or some other type of electric motor which can be readily reversed in the direction that it is operating with a minimum of stress on the equipment associated with the reversible blower 150. Typically, a controller is coupled to the reversible blower 150 which sends a signal at an appropriate time to the reversible blower 150 to cause it to reverse from pushing air into the vessel 120 to pulling gas out of the vessel 120.

The purge recovery tank 160 is preferably provided with an opening thereinto coupled to the $O_2$ supply line 125, preferably at a junction 162 between the outlet 124 of the vessel 120 and the product check valve 145. As an alternative, the purge recovery tank 150 can be coupled directly to the adsorber vessel 120 typically at a portion of the adsorber vessel 120 on a side of the vessel 120 opposite the inlet 122.

A control valve 165 is interposed between the tank 160 and the $O_2$ supply line 125. Alternatively, this control valve 167 can be interposed between the tank 160 and the vessel 120. In either configuration, the control valve 165, 167 transitions from a closed state where the purge recovery tank 160 is isolated from the $O_2$ supply line 125 and the adsorber vessel 120 and an open state where the purge recovery tank 160 is open to the $O_2$ supply line 125 and/or adsorber vessel 120. The control valve 165, 167 is typically coupled to a servo motor so that it is in the form of a servo valve (SV).

The control valve 165 is coupled to a controller which can be coupled to or the same as the controller associated with the reversible blower 150, so that opening and closing of the purge recovery tank 160 occurs in a synchronized fashion with reversing of the reversible blower 150. If desired, such a controller or group of controllers can also be coupled to sensors such as a nitrogen sensor which can detect trace amounts of $N_2$ downstream of the vessel 120 and indicative that the material within the vessel 120 is approaching saturation and the need to enter a recovery phase by reversing the reversible blower 150 and drawing nitrogen out of the vessel 120 through drawing a vacuum within the vessel 120. The controller can optionally include a clock and reverse the blower (and open/close the valve 165, 167) after set amounts of time have passed.

The compressor 170 is optionally provided downstream of the $O_2$ supply line 125 and downstream of any $O_2$ process tank 140. Preferably a compressor check valve 175 is provided upstream of the compressor 170. The compressor 170 allows for control of a pressure desired for $O_2$ supplied from the ASU 110. The compressor check valve 175 assists in keeping $O_2$ downstream of the compressor 170 from backing up into the ASU 110.

Figure 3:
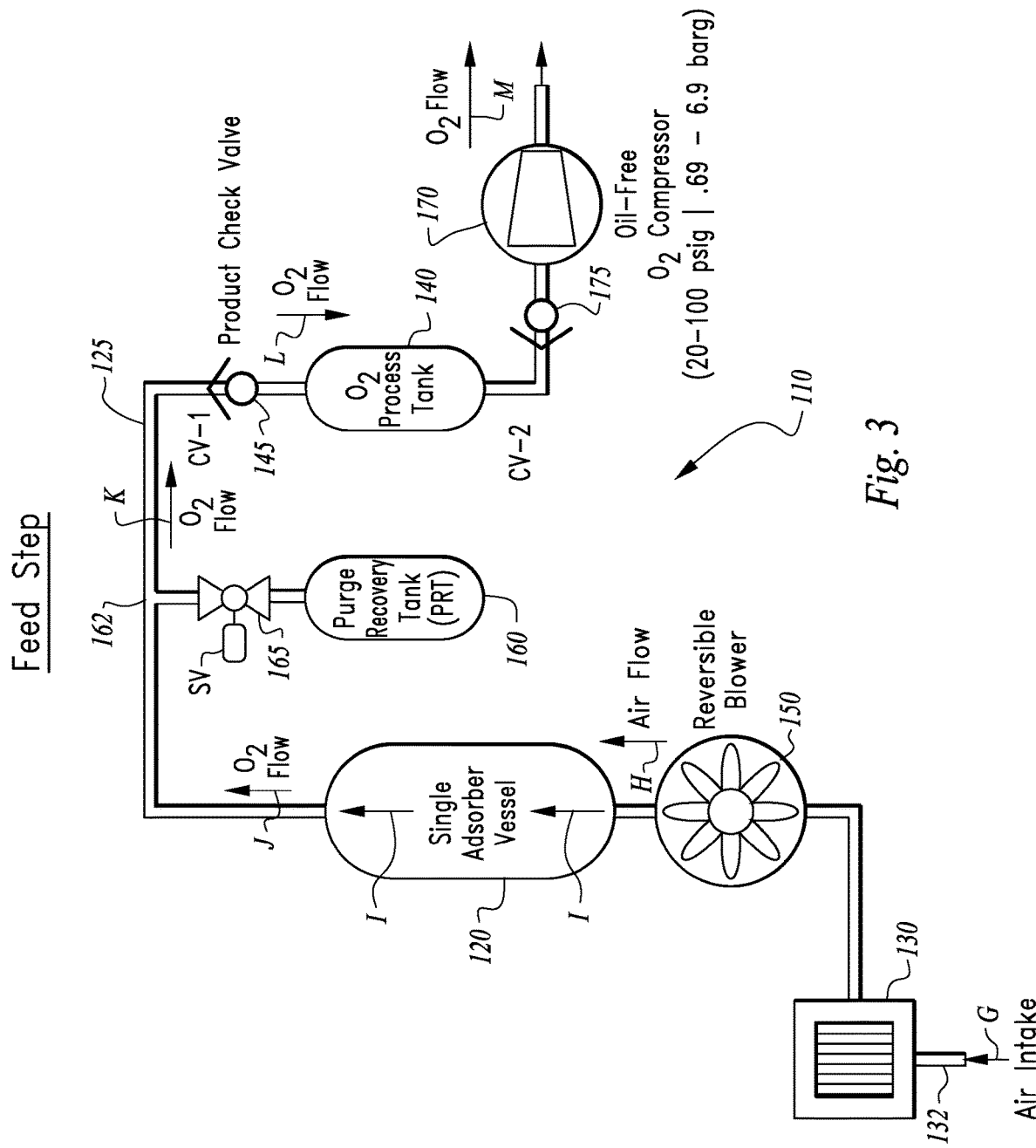
FIGS. 3-5 are schematics similar to that which is shown in FIG. 2, but with various different arrows depicting various steps in the operation of the reversing blower vacuum swing adsorption air separation unit according to this invention.
Figure 5:
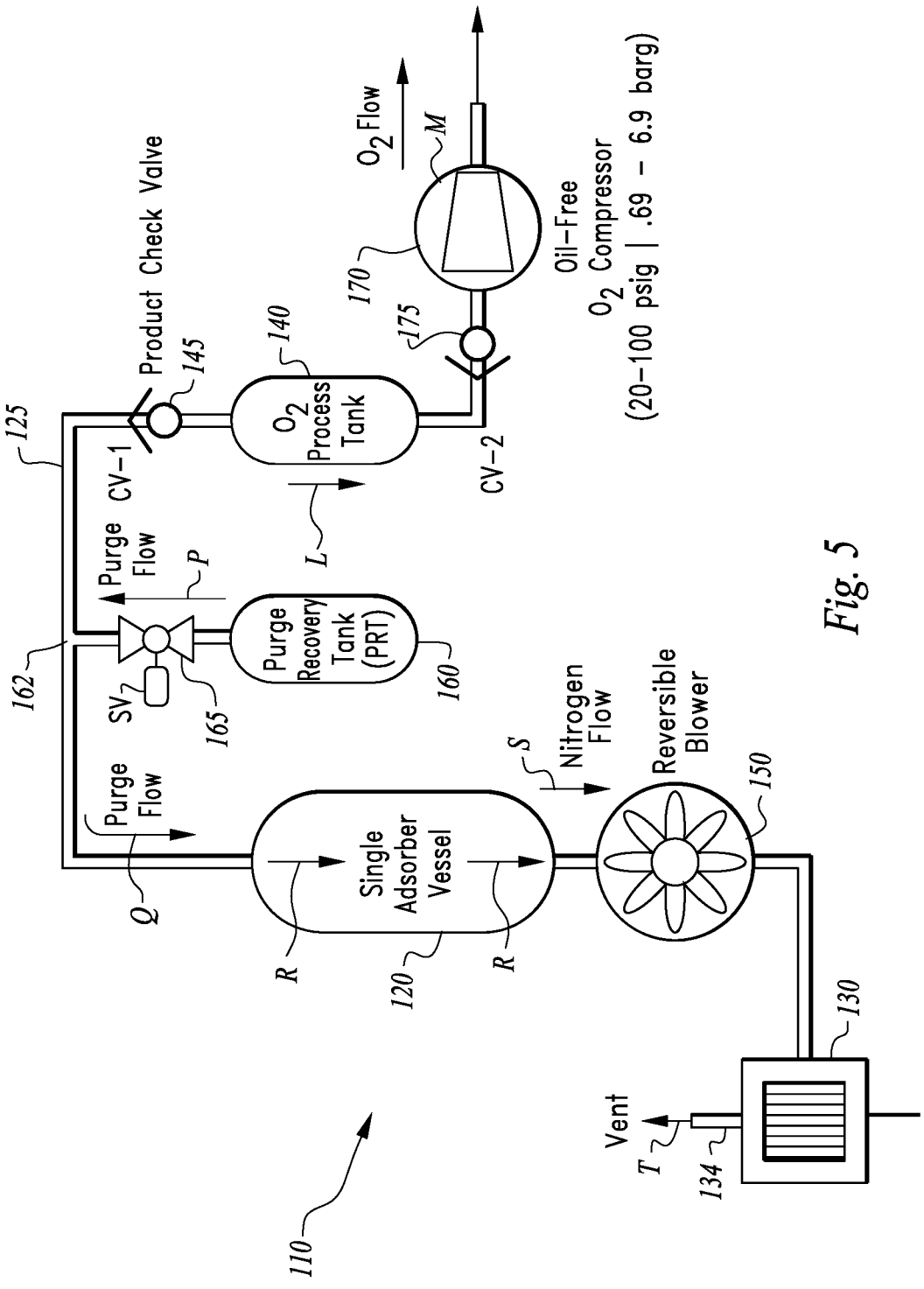

With particular reference to FIGS. 3-5, general steps in operation of the ASU 110 are described. FIG. 3 depicts a feed step for the ASU 110. In this step the reversible blower 150 draws air from the air intake 130 through the air port 132, along arrow G. The blower 150 drives air along arrow H into the vessel 120. The air passes through the vessel 120 (along arrow I) where nitrogen is selectively adsorbed. Gas of mostly $O_2$ flows out of the vessel 120 (along arrow J) and within the $O_2$ supply line 125. The control valve 165 of the purge recovery tank 160 is closed during the beginning of the feed step so that $O_2$ flow continues past the junction 162 and through the $O_2$ supply line 125 (along arrow K). The oxygen then passes through the product check valve 145 and into the $O_2$ process tank 140 (along arrow L). Further, the $O_2$ can flow through the compressor check valve 175 and through the compressor 170 for discharge from the ASU 110 (along arrow M).

Such a feed step (as depicted in FIG. 3) continues as long as the material within the vessel 120 has excess capacity for adsorption of nitrogen. When this adsorption material within the vessel 120 becomes saturated with nitrogen, the ASU 110 needs to prepare for recharging the adsorption material within the vessel 120. To detect that such recharging/restoration of the material within the vessel 120 is needed, the ASU 110 can follow a timing circuit or follow gas flow valves which measure an amount of gas flow, or can include a nitrogen sensor or other sensor downstream of the vessel 120 which indicate that the gas downstream of the vessel 120 is indicative that recharging/reconditioning of the material within the vessel 120 is needed.

Preparation for recovery of the material within the vessel 120 can occur in a couple of slightly different but closely related ways. In one embodiment, such preparation begins by opening of the control valve 165 (or valve 167). The interior of the pressure recovery tank 160 preferably has pressure below atmospheric pressure so that gas of mostly oxygen (but with perhaps some nitrogen present) flows quickly into the purge recovery tank 160 through the control valve 165.

When the purge recovery tank 160 is full, or when the purge recovery tank 160 is achieving a fill level which is sufficiently great to satisfy its purposes in purge recovery for the vessel 120, the control valve 165 is closed. The purge recovery tank 160 thus contains and holds a charge of mostly $O_2$ (but typically with some $N_2$ and other contaminates present) as a purge charge which can be at near atmospheric pressure, or conceivably above atmospheric pressure if pressure downstream of the vessel 120 is above atmospheric pressure.

The reversible blower 150 is instructed to reverse so that air is no longer driven into the vessel 120, but the blower 150 reverses and gases begin to be pulled out of the vessel 120, through the reversible blower 150 and back to the intake 130. The precise moment of beginning reversing of the reversible blower 150 could be before the control valve 165 associated with the purge recovery tank 160 has closed, or could be at the same time that the control valve 165 closes, or could be slightly after the control valve 165 closes. The reversible blower 150 typically takes some time to stop moving in a forward direction and then begin moving in a reverse direction. This slow down to zero velocity and speed up in a reverse direction also define a time period which can be during which the control valve 165 closes or immediately before or immediately after the control valve 165 closes.

The reversible blower 150 then operates in a reverse direction drawing a vacuum on the adsorber vessel 120 and portions of the $O_2$ supply line 125 between the adsorber vessel 120 and the product check valve 145 or other valve on the $O_2$ supply line 125 which resists the draw of vacuum within the $O_2$ supply line 125. Pressure is thus reduced within the $O_2$ supply line 125 and the adsorber vessel 120. Gas flow through the vessel 120 occurs along arrow R of FIG. 5. As the pressure is reduced within the adsorber vessel, the ability of the material within the vessel 120 to hold $N_2$ decreases. $N_2$ is thus released from the adsorber material and flows, along arrow S (FIG. 5) through the reversible blower 150 and out of the purge port 134 of the intake 130 (along arrow T of FIG. 5). After a sufficient amount of time and sufficiently low pressure is achieved within the vessel 120 to satisfactorily allow the material within the vessel 120 to recover, the ASU 110 then undergoes preparation for re-reversing the reversible blower 150 and returning the ASU 110 back to the feed mode (FIG. 3). This preparation typically initially involves opening of the control valve 165 (or valve 167) associated with the purge recovery tank 160. The mostly $O_2$ (with some $N_2$) gas that has been stored therein is thus released through the control valve 165 and into the $O_2$ supply line 125 (or directly into the vessel 120 through the valve 167 of FIG. 2).

This purge of mostly $O_2$ with other gases into the low pressure vessel 120 allows for pressure within the vessel 120 to be quickly restored and also for the low quality purge gas which contains some $N_2$ and other contaminant gases therein to again contact the adsorption material within the vessel 120 for removal of $N_2$ and other contaminants therefrom. Such purge flow is generally depicted by arrow P and also be arrow Q for return back into the adsorber vessel 120 (FIG. 5).

The vessel 120 has thus been fully prepared for returning back to the feed step. The reversible blower 150 can then be re-reversed to again drive airflow (along arrow H of FIG. 3) from the intake 130 (along arrow G) and through the vessel 120 (along arrow I). The control valve 165 with the purge recovery tank 160 can be closed just before the reversible blower 150 re-reverses, at the same time that the reversible blower 150 re-reverses, or shortly after the reversible blower 150 re-reverses.

Various factors such as the volume of gas which can reside within the various lines adjacent to the purge recovery tank 160 and whether the ASU 110 is to be optimized for $O_2$ purity, energy efficiency, or production rate, can be factored into determining precisely when the control valve 165 (or 167) should be returned to its closed state. Similar optimization can occur when determining when to initially open the control valve 165 and also when to initially close the control valve 165. The control valve 165 is re-closed so that it maintains a vacuum therein to make the purge recovery tank 160 most effective when it is again utilized in the next iteration of the cycle performed by the ASU 110.

Figure 6:
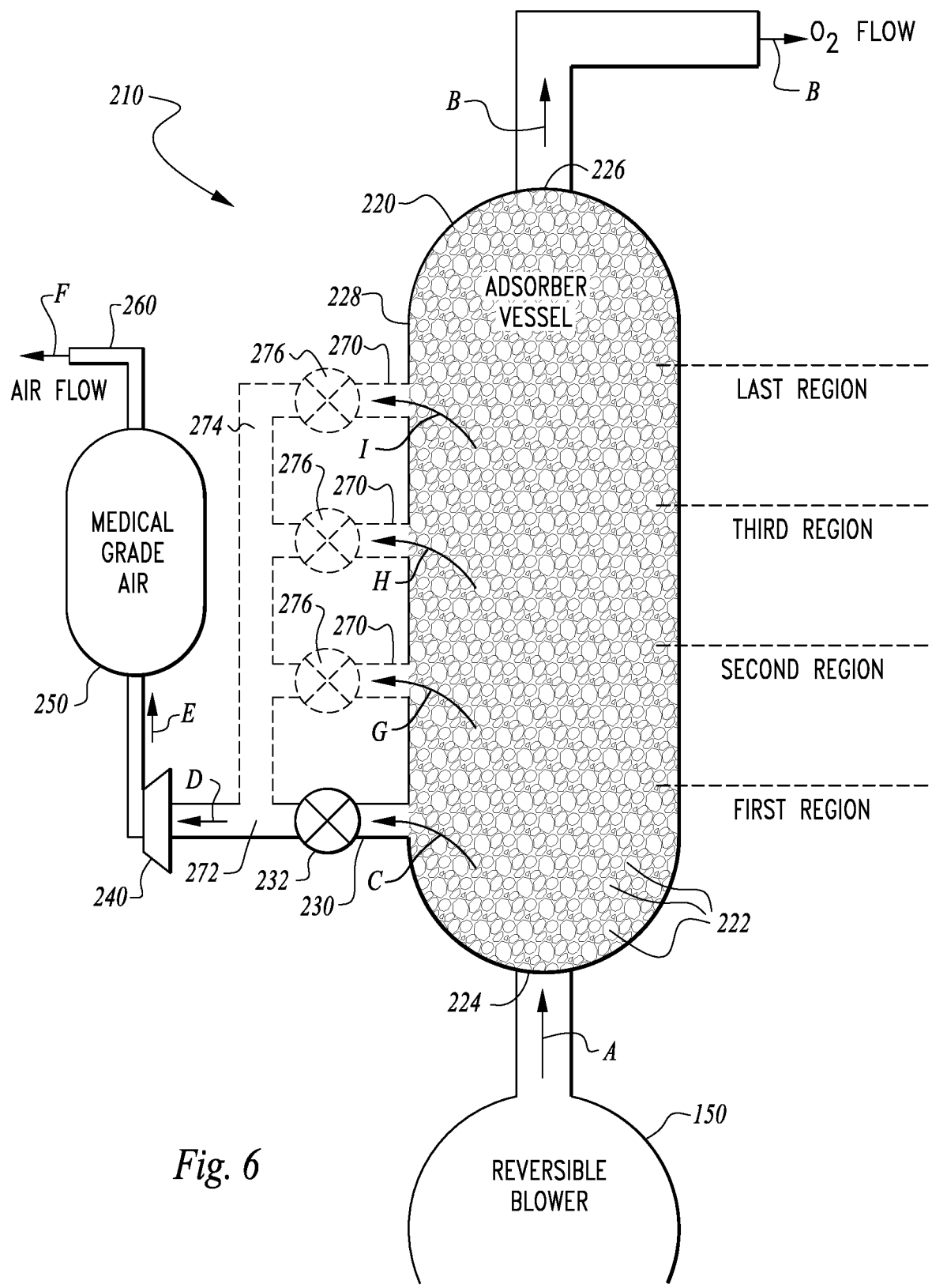
FIG. 6 is a schematic of a portion of the air separation unit shown in FIGS. 2-5, including the adsorber vessel, which has been modified according to this invention to include at least one dry air tap along with other portions of a dry air collection system.

With particular reference to FIG. 6, details of a dry air collection system 210 are described according to one embodiment of this invention. The dry air collection system 210 can be incorporated into the air separation unit 110 (FIGS. 2-5) or could be incorporated into other adsorption based air separation units, such as the single bed reversing blower vacuum swing adsorption system depicted in FIG. 1. Other adsorption based air separation systems, including multiple bed systems and non-reversing blower systems and pressure swing adsorption systems could also provide basic systems in which the adsorber vessel 220 or similar vessel could be incorporated as part of a dry air collection system 210 added to any such prior art adsorption based air separation technology.

With the dry air collection system 210, prior art adsorption vessels are replaced with the adsorber vessel 220 (in this preferred embodiment). The adsorber vessel 220 preferably has an elongate form with opposite ends spaced apart by a side wall 228. An air entry 224 is located at one end of the vessel 220 and an $O_2$ discharge 226 is provided at an end of the adsorber vessel 220 opposite the entry 224. The entry 224 is downstream of a reversible blower in this embodiment and defines a portion of the adsorber vessel 220 closest to the reversible blower. The discharge 226 provides a discharge for oxygen from the adsorber vessel 220, with the discharge 226 typically defining a portion of the adsorber vessel 220 most distant from the reversible blower 150. Adsorption media 222 is located within the adsorber vessel 220. This media 222 leaves gaps between beads or other units thereof through which air/gas can pass while coming intimately adjacent to surfaces of the media 222.

The media 222 is of a type which selectively adsorbs nitrogen over oxygen, generally in the form of an appropriate microporous aluminosilicate ziolite. Furthermore, such media 222 also selectively adsorbs water vapor over oxygen. Still further, and according to a preferred embodiment of this invention, the media 222 adsorbs water vapor preferentially over nitrogen. In this way, as air passes into the adsorber vessel 220 (along arrow A of FIG. 6) when it first comes into intimate position adjacent to the media 222, water vapor in the air is first adsorbed. As the air flows into the adsorber vessel 220, the media 222 begins to become saturated with either water vapor or nitrogen, allowing the oxygen to pass on through the adsorber vessel 220 and out of the discharge 226. Over time, the media 222 becomes saturated with water vapor and nitrogen. However, media 222 closest to the entry 224 becomes saturated first, while media 222 adjacent to the discharge 226 does not become saturated until late in the cycle, just before the reversible blower 150 reverses to draw a vacuum (or at least lower pressure) on the adsorber vessel 220 to cause the release ("desorption") of nitrogen, and water vapor from the adsorption media 222.

One can think of the adsorber vessel 220 as having multiple regions with a first region adjacent to the entry 224 and a last region adjacent to the discharge 226. Other regions could be thought of between this first region and last region, such as a second region adjacent to the first region and a third region between the second region and the last region. Media 222 in the first region becomes saturated first, followed by media in the second region, followed by media in the third region, and lastly saturated in the last region and portions of the adsorber vessel 220 past the last region.

Furthermore, before the first region has become saturated, the first region is preferentially adsorbing water vapor so that nitrogen is still present in large amounts when the gas entering the adsorber vessel 220 reaches the second region. The second region thus adsorbs mostly nitrogen. When the first region become saturated, the ambient air entering the adsorption vessel 220 (along arrow A of FIG. 6) remains substantially unmodified as it passes through the first region because the media 222 is saturated. When such substantially unmodified air reaches the second region, the adsorption media 222 is able to remove the water vapor preferentially over the nitrogen, with nitrogen being adsorbed disproportionately in the third region, and leaving oxygen to pass on to the discharge 226.

This process continues as the media 222 becomes progressively saturated thereafter in the third region, and then in the last region. Thus, the gas passing from the entry 224 to the discharge 226 transitions from being ambient air including water vapor therein, to becoming dry air, and then before becoming largely oxygen.

With this invention, and as illustrated in this preferred embodiment, a dry air tap 230 is located in the first region. This dry air tap 230 can be opened when the adsorber vessel 220 is full of fresh media 222, so that dry air is pulled from the dry air tap 230 (along arrow C of FIG. 6). A valve 232 is located on the dry air tap 230. This valve 232 can be opened to allow dry air to pass therethrough (along arrow D of FIG. 6). The valve 232 could optionally be a check valve that is always open, except when the blower 150 reverses, to prevent back flow.

In this embodiment the dry air then passes through a compressor 240 where it is pressurized and then passes (along arrow E of FIG. 6) into a tank 250. This tank 250 contains substantially dry air which can function as medical grade air or for other purposes where dry air is needed. The dry air is discharged through a supply 260 (along arrow F of FIG. 6).

When the first region has become saturated, the valve 232 would typically be closed so that ambient air which has not been dried of its water vapor does not pass through the tap 230 and contaminate the dry air within the tank 250. However, the valve 232 could stay open, in that water vapor is still typically adsorbed even when the media 222 is largely saturated. In one embodiment of this invention, the single dry air tap 230 would be utilized for a predetermined amount of time when the media 222 within the adsorber vessel 220 is fresh. When the first region becomes saturated, the valve 232 is closed. The valve 232 is not reopened until the media 222 within the adsorber vessel 220 has been refreshed. As an alternative to time based control of the valve 232, a moisture sensor could be provided within the adsorber vessel 220 or within the dry air tap 230 upstream of the valve 232 (or conceivably downstream of the valve 232) to sense for the presence of water vapor. When an undesirably high amount of water vapor is detected, the valve 232 could be automatically closed. As another alternative, humidity of the ambient air could be monitored and a controller could control the opening and closing of the valve 232 based either on calculations as to how long the valve 232 should remain open, or based on empirical values which are derived from testing and experience to be appropriate times to open and close the valve 232 for various different air humidities.

In a further embodiment of this invention, multiple auxiliary taps 270 are provided downstream of the dry air tap 230. In this exemplary embodiment, one auxiliary tap 270 is provided in each of the regions downstream of the first region. Each of the auxiliary taps 270 preferably has its own valve 276 which feeds into a manifold line 274 which passes through a junction 272 where it joins with the dry air tap 230 upstream of a common compressor 240. As an alternative, it is conceivable that the multiple valves 276 could be replaced with a single control valve with four inlets and one outlet and which optionally only allows one inlet to be open at any given time (also typically including a state for the valve where all taps are closed or with a separate check valve to prevent back flow).

When utilizing an embodiment of this invention with the dry air tap 230 and the auxiliary taps 270, when the media 222 within the adsorber vessel 220 is fresh, the valve 232 would be initially open and the valves 276 associated with the auxiliary taps 270 would all be closed. When the valve 232 is later closed, the valve 276 associated with the auxiliary tap 270 in the second region would be opened. After a further predetermined amount of time, this valve would be closed and the valve 276 associated with the auxiliary tap 270 in a third region would be opened. Finally, when the valve 276 in the third region is closed, the valve 276 in the last region would be opened. At an appropriate predetermined time, this last valve 276 in the last region would be closed shortly before the adsorber vessel 220 undergoes recharging by reversing of the blower 150.

Throughout this process, oxygen would continue to flow (along arrow B of FIG. 6) out of the oxygen discharge 226. When the media 222 in the adsorber vessel 220 is fresh, dry air would pass (along arrow C of FIG. 6) through the dry air tap 230 while remaining air would pass toward the discharge, have nitrogen adsorbed into the media 222, and allow oxygen to flow out of the discharge 226 for collection downstream according to the configuration of the air separation unit in which the dry air collection system 210 of this invention is incorporated.

For versions of the system 210 that include auxiliary taps 270, when the auxiliary tap 270 in the second region is opened, dry air would flow (along arrow G of FIG. 6) into the auxiliary tap 270 in the second region. Thereafter, valves 276 would be closed and opened so that dry air would flow (along arrow H of FIG. 6) from the auxiliary tap 270 located in the third region. Finally, valves 276 would be closed and opened so that dry air would flow (along arrow I of FIG. 6) from the auxiliary tap 270 located in the last region. While this embodiment of the system 210 including the auxiliary taps 270 is depicted with four separate taps 230, 270 total, a greater or lesser number of taps 270, 230 could be provided.

With this invention, typically some nitrogen is also removed from the ambient air along with the water vapor. Because the adsorption media 222 preferably adsorbs water vapor preferentially over nitrogen, this amount of nitrogen adsorbed in the dry air passing through the dry air tap 230 (along arrow C of FIG. 6) would be minimal. Furthermore, because air is eighty percent nitrogen approximately, even if the air loses half of its nitrogen, it would still be a gas which has twice as much nitrogen as oxygen and would function for most purposes as dry air. With this invention, dry air is considered to be air which has had at least some of its water vapor removed and which has more $N_2$ than $O_2$.

To ensure that a gas without too high of a percentage of oxygen is collecting within the tank 250, oxygen sensors can be provided to monitor the dry air. If an excessively high oxygen content is detected, the valve 232 could be closed for a short initial period when the media 222 within the vessel 220 is its very freshest, and not open until an acceptably small amount of nitrogen is being removed from the dry air. As an alternative, when nitrogen is being discharged during refreshing of the adsorber vessel 220, the valve 232 or other ones of the valves 276 associated with the auxiliary taps 270 could be opened for at least a small period of time, to draw nitrogen from the adsorber vessel 220, by action of the compressor 240 and into the tank 250. Through either gas sensors, theoretical analysis, or empirical evidence gathered over time, the amount of nitrogen required to be collected during this recharging phase for the media 222 within the adsorber vessel 220, to allow nitrogen to be pulled and added to the dry air within the tank 250, can be determined and the valves 232, 276 opened for an appropriate amount of time to dilute the dry air back to having at least approximately eighty percent nitrogen.

In still other instances where it is acceptable to have the dry air have a greater amount of nitrogen than nitrogen present within the air, a larger amount of nitrogen can be scavenged during refreshing of the adsorber vessel 220 as disclosed above, to provide gas within the tank 250 having the constituency desired. As a still further alternative, when nitrogen is removed from the adsorber vessel 220 through an inlet into the system on a side of the reversible blower 150 opposite the adsorber vessel 220, some of this nitrogen can be collected. Medical grade air within the tank 250 or elsewhere within the dry air collection system 210 can be later analyzed and if determined to have an undesirably low amount of nitrogen therein, nitrogen collected during the refreshing process can be utilized to cause gas within the tank 250 to meet the specifications desired.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A system for production of oxygen and dry air from an adsorption based air separation unit, comprising in combination:
   a reversible blower adjacent to an adsorber vessel;
   said reversible blower having a forward mode for drawing air into said adsorber vessel and a reverse mode for pushing gas out of said adsorber vessel;
   said adsorber vessel containing an adsorption media which selectively adsorbs water vapor and nitrogen preferentially over oxygen;
   said adsorber vessel having an oxygen discharge spaced from an air entry, with said air entry closer to said reversible blower than a distance from said oxygen discharge to said reversible blower;
   said adsorber vessel having a dry air tap between said air entry and said oxygen discharge; and
   wherein said dry air tap is one of multiple dry air taps, each said dry air tap spaced a different distance from said air entry.

2. The system of claim 1 wherein said adsorber vessel is elongate in form with said air entry and said oxygen discharge located at opposite ends of said adsorber vessel.

3. The system of claim 2 wherein said dry air tap is closer to said air entry than to said oxygen discharge.

4. The system of claim 3 wherein said adsorber vessel has a substantially cylindrical side wall extending between said ends, said dry air tap passing through said side wall.

5. The system of claim 1 wherein a compressor is located downstream of said dry air tap, said compressor elevating a pressure of gas passing from said adsorber vessel through said dry air tap.

6. The system of claim 1 wherein a dry air storage is located downstream of said dry air tap.

7. The system of claim 1 wherein at least one valve is associated with said multiple taps, said at least one valve having an at least partially open state and an at least partially closed state, said at least partially closed state being more closed than said at least partially open state.

8. The system of claim 1 wherein each of said multiple taps has a valve associated therewith, each of said valves having an at least partially open state and an at least partially closed state with said at least partially open state more open than said at least partially closed state.

9. A method for separation of dry air and oxygen from ambient air, the method including the steps of:

drawing ambient air into a reversible blower and into an entry of an adsorption bed downstream of the reversible blower, the adsorption bed containing adsorption media which selectively adsorbs water vapor and nitrogen preferentially over oxygen;

discharging oxygen from a portion of the adsorption bed spaced from the entry;

drawing dry air from a dry air tap in the adsorption bed between the entry and an oxygen discharge from the adsorption bed which is further from the entry than a distance from the dry air tap to the entry; and wherein said drawing step includes multiple dry air taps in the adsorption bed, each of the multiple taps spaced different distances from the entry.

10. The method of claim 9 wherein said drawing step includes at least one of the dry air taps being closer to the entry than to the discharge.

* * * * *